United States Patent
Parthasarathi et al.

(10) Patent No.: US 10,404,748 B2
(45) Date of Patent: Sep. 3, 2019

(54) CYBER RISK ANALYSIS AND REMEDIATION USING NETWORK MONITORED SENSORS AND METHODS OF USE

(71) Applicant: Guidewire Software, Inc., Foster City, CA (US)

(72) Inventors: Arvind Parthasarathi, Los Altos, CA (US); George Y. Ng, San Mateo, CA (US); Matthew Honea, San Mateo, CA (US)

(73) Assignee: Guidewire Software, Inc., San Mateo, CA (US)

( * ) Notice: Subject to any disclaimer, the term of this patent is extended or adjusted under 35 U.S.C. 154(b) by 21 days.

(21) Appl. No.: 15/082,890

(22) Filed: Mar. 28, 2016

(65) Prior Publication Data

US 2016/0294854 A1 Oct. 6, 2016

Related U.S. Application Data

(60) Provisional application No. 62/141,114, filed on Mar. 31, 2015.

(51) Int. Cl.
*H04L 29/06* (2006.01)
(52) U.S. Cl.
CPC .......... *H04L 63/20* (2013.01); *H04L 63/1408* (2013.01)
(58) Field of Classification Search
CPC ............................ H04L 63/20; H04L 63/1408
See application file for complete search history.

(56) References Cited

U.S. PATENT DOCUMENTS

| 6,269,349 B1 | 7/2001 | Aieta et al. |
| 6,374,358 B1 | 4/2002 | Townsend |

(Continued)

FOREIGN PATENT DOCUMENTS

| TW | 201636937 A | 10/2016 |
| WO | WO2014038396 A1 | 3/2014 |

(Continued)

OTHER PUBLICATIONS

Scarfone et al., NIST Special Publication 800-118, "Guide to Enterprise Password Management (Draft)", Apr. 2009, NIST (National Institute of Standards and Technology), pp. 1-40.*

(Continued)

*Primary Examiner* — Robert B Leung
*Assistant Examiner* — Thomas Ho
(74) *Attorney, Agent, or Firm* — Van Pelt, Yi & James LLP (57) ABSTRACT

Systems and methods for cyber risk analysis and remediation using network monitored sensors are provided herein. An example system includes one or more data collecting devices deployed within a network that collect entity information and monitor network traffic of the network that is related to security information. The network includes computing systems that are subject to a cyber risk policy having breach parameters defining one or more events that are indicative of a cyber security breach. A cyber security risk assessment and management system is used to automatically detect occurrence of one or more of the events that are indicative of a cyber security breach, automatically determine the breach parameters that apply for the one or more events that occurred, and generates a remediation of cyber security parameters for the network.

20 Claims, 6 Drawing Sheets

(56) References Cited

U.S. PATENT DOCUMENTS

| | | | |
|---|---|---|---|
| 7,047,419 B2 | 5/2006 | Black | |
| 7,324,952 B2 | 1/2008 | Hisano | |
| 7,680,659 B2 | 3/2010 | Gao et al. | |
| 7,711,646 B2 | 5/2010 | Cianciarulo et al. | |
| 8,332,242 B1 | 12/2012 | Medina, III | |
| 8,448,245 B2 | 5/2013 | Banerjee et al. | |
| 8,468,599 B2 | 6/2013 | McCusker et al. | |
| 8,484,066 B2 | 7/2013 | Miller et al. | |
| 8,494,955 B2 | 7/2013 | Quarterman et al. | |
| 8,577,775 B1 | 11/2013 | Gerber | |
| 8,601,587 B1 | 12/2013 | Powell et al. | |
| 8,699,767 B1 | 4/2014 | Khosla et al. | |
| 8,744,894 B2 | 6/2014 | Christiansen | |
| 8,973,088 B1* | 3/2015 | Leung | H04L 63/00 726/1 |
| 9,031,951 B1 | 5/2015 | Baluja et al. | |
| 9,253,203 B1 | 2/2016 | Ng | |
| 9,292,881 B2 | 3/2016 | Alperovitch et al. | |
| 9,373,144 B1 | 6/2016 | Ng et al. | |
| 9,521,160 B2 | 12/2016 | Ng et al. | |
| 9,646,428 B1 | 5/2017 | Konrardy et al. | |
| 9,699,209 B2 | 7/2017 | Ng et al. | |
| 10,230,764 B2 | 3/2019 | Ng | |
| 2002/0026335 A1 | 2/2002 | Honda | |
| 2002/0091551 A1 | 7/2002 | Parisi | |
| 2003/0014342 A1 | 1/2003 | Vande Pol | |
| 2003/0014344 A1 | 1/2003 | Chacko et al. | |
| 2003/0028803 A1 | 2/2003 | Bunker et al. | |
| 2003/0040942 A1 | 2/2003 | Hooten | |
| 2003/0084349 A1 | 5/2003 | Friedrichs et al. | |
| 2003/0126049 A1 | 7/2003 | Nagan et al. | |
| 2003/0135758 A1 | 7/2003 | Turner | |
| 2003/0154393 A1 | 8/2003 | Young | |
| 2003/0236990 A1* | 12/2003 | Hrastar | H04L 41/0893 726/11 |
| 2004/0006532 A1 | 1/2004 | Lawrence et al. | |
| 2004/0010709 A1 | 1/2004 | Baudoin et al. | |
| 2004/0024693 A1 | 2/2004 | Lawrence | |
| 2004/0049698 A1* | 3/2004 | Ott | G06F 21/554 726/23 |
| 2004/0064726 A1 | 4/2004 | Girouard | |
| 2004/0260945 A1* | 12/2004 | Raikar | G06F 21/554 726/23 |
| 2005/0015624 A1* | 1/2005 | Ginter | G06F 21/55 726/4 |
| 2005/0044418 A1 | 2/2005 | Miliefsky | |
| 2005/0261943 A1 | 11/2005 | Quarterman et al. | |
| 2005/0278786 A1 | 12/2005 | Tippett et al. | |
| 2006/0184473 A1 | 8/2006 | Eder | |
| 2006/0265746 A1* | 11/2006 | Farley | G06F 21/577 726/22 |
| 2007/0192867 A1 | 8/2007 | Miliefsky | |
| 2007/0294118 A1 | 12/2007 | Tait et al. | |
| 2008/0016563 A1 | 1/2008 | McConnell et al. | |
| 2008/0047016 A1 | 2/2008 | Spoonamore | |
| 2008/0162377 A1 | 7/2008 | Pinkas | |
| 2008/0167920 A1 | 7/2008 | Schmidt et al. | |
| 2008/0250064 A1 | 10/2008 | Duchon et al. | |
| 2009/0024663 A1 | 1/2009 | McGovern | |
| 2009/0037323 A1 | 2/2009 | Feinstein | |
| 2009/0063365 A1 | 3/2009 | Pinkas | |
| 2009/0319342 A1 | 12/2009 | Shilman et al. | |
| 2010/0114634 A1 | 5/2010 | Christiansen et al. | |
| 2010/0205014 A1 | 8/2010 | Sholer et al. | |
| 2010/0229187 A1 | 9/2010 | Marwah et al. | |
| 2011/0078073 A1 | 3/2011 | Annappindi | |
| 2011/0154497 A1 | 6/2011 | Bailey, Jr. | |
| 2011/0161116 A1 | 6/2011 | Peak et al. | |
| 2011/0313930 A1 | 12/2011 | Bailey, Jr. | |
| 2012/0011077 A1 | 1/2012 | Bhagat | |
| 2012/0041790 A1 | 2/2012 | Koziol | |
| 2012/0046989 A1* | 2/2012 | Baikalov | G06Q 10/0635 705/7.28 |
| 2012/0059779 A1 | 3/2012 | Syed et al. | |
| 2012/0089617 A1 | 4/2012 | Frey | |
| 2012/0096558 A1 | 4/2012 | Evrard | |
| 2012/0215575 A1 | 8/2012 | Deb et al. | |
| 2012/0239438 A1 | 9/2012 | Hemmings | |
| 2012/0284158 A1 | 11/2012 | Kovac | |
| 2012/0300975 A1 | 11/2012 | Chalamala et al. | |
| 2013/0055404 A1 | 2/2013 | Khalili | |
| 2013/0188475 A1 | 7/2013 | Lim et al. | |
| 2013/0191829 A1 | 7/2013 | Shimokawa et al. | |
| 2013/0239167 A1 | 9/2013 | Sreenivas et al. | |
| 2013/0239168 A1 | 9/2013 | Sreenivas et al. | |
| 2013/0239177 A1 | 9/2013 | Sigurdson et al. | |
| 2013/0283336 A1 | 10/2013 | Macy et al. | |
| 2013/0346328 A1 | 12/2013 | Agle et al. | |
| 2013/0347060 A1 | 12/2013 | Hazzani | |
| 2014/0007190 A1 | 1/2014 | Alperovitch et al. | |
| 2014/0019171 A1 | 1/2014 | Koziol | |
| 2014/0067713 A1 | 3/2014 | Gerber | |
| 2014/0067716 A1 | 3/2014 | Gerber | |
| 2014/0137257 A1 | 5/2014 | Martinez et al. | |
| 2014/0142988 A1 | 5/2014 | Grosso et al. | |
| 2014/0200930 A1 | 7/2014 | Zizzamia et al. | |
| 2014/0328179 A1 | 11/2014 | Kabakura | |
| 2014/0379708 A1 | 12/2014 | Fox | |
| 2015/0088595 A1 | 3/2015 | Chillar | |
| 2015/0188949 A1 | 7/2015 | Mahaffey et al. | |
| 2015/0331932 A1 | 11/2015 | Georges et al. | |
| 2015/0341389 A1 | 11/2015 | Kurakami | |
| 2015/0373043 A1* | 12/2015 | Wang | G06F 21/552 706/12 |
| 2016/0099963 A1 | 4/2016 | Mahaffey | |
| 2016/0189301 A1 | 6/2016 | Ng et al. | |
| 2016/0205138 A1 | 7/2016 | Krishnaprasad | |
| 2016/0212169 A1* | 7/2016 | Knjazihhin | H04L 63/20 |
| 2016/0234247 A1 | 8/2016 | Ng et al. | |
| 2016/0248799 A1 | 8/2016 | Ng et al. | |
| 2016/0248800 A1 | 8/2016 | Ng et al. | |
| 2016/0294854 A1 | 10/2016 | Parthasarathi | |
| 2017/0085595 A1 | 3/2017 | Ng et al. | |
| 2017/0093904 A1 | 3/2017 | Ng et al. | |
| 2017/0093905 A1 | 3/2017 | Ng et al. | |
| 2017/0116552 A1 | 4/2017 | Deodhar et al. | |
| 2017/0187745 A1 | 6/2017 | Ng et al. | |

FOREIGN PATENT DOCUMENTS

| | | |
|---|---|---|
| WO | WO2016109162 A1 | 7/2016 |
| WO | WO2016109608 A1 | 7/2016 |
| WO | WO2017078986 A1 | 5/2017 |

OTHER PUBLICATIONS

"Password Complexity Recommendations", Martin Salois, Defense Research and Development Canada, Oct. 2014, pp. 1-34.*

International Search Report & Written Opinion dated Feb. 10, 2016 in Patent Cooperation Treaty Application No. PCT/US2015/065365, filed Dec. 11, 2015.

Böhme et al., "Models and Measures for Correlation in Cyber-Insurance," Workshop on the Economics of Information Security (WEIS), Jun. 2006, Retrieved from <http://www.econinfosec.org/archive/weis2006/docs/16.pdf>.

International Search Report & Written Opinion dated Feb. 26, 2016 in Patent Cooperation Treaty Application No. PCT/US2015/067968, filed Dec. 29, 2015.

Raftery, Adrian et al., "Variable Selection for Model-Based Clustering," Journal of the American Statistical Association, Mar. 2006, pp. 168-178, http://www.stat.washington.edu/raftery/Research/PDF/dean2006.pdf.

Non-Final Office Action, dated Aug. 23, 2017, U.S. Appl. No. 15/371,047, filed Dec. 6, 2016.

Notice of Allowance, dated Aug. 24, 2017, U.S. Appl. No. 15/099,297, filed Apr. 14, 2016.

Non-Final Office Action, dated Sep. 7, 2017, U.S. Appl. No. 15/374,212, filed Dec. 9, 2016.

Non-Final Office Action, dated Sep. 7, 2017, U.S. Appl. No. 15/373,298, filed Dec. 8, 2016.

(56) References Cited

OTHER PUBLICATIONS

"International Search Report" and "Written Opinion of the International Searching Authority," Patent Cooperation Treaty Application No. PCT/US2016/058711, dated Dec. 8, 2016, 9 pages.
Notice of Allowance dated Jan. 3, 2017 for U.S. Appl. No. 15/142,997, filed Apr. 29, 2016.
Notice of Allowance dated Mar. 15, 2016 for U.S. Appl. No. 14/931,510, filed Nov. 3, 2015.
Notice of Allowance dated Sep. 25, 2015 for U.S. Appl. No. 14/585,051, filed Dec. 29, 2014.
Office Action dated Apr. 1, 2015 for U.S. Appl. No. 14/585,051, filed Dec. 29, 2014.
Office Action dated Apr. 20, 2015 in U.S. Appl. No. 14/614,897, filed Feb. 5, 2015.
Office Action dated Oct. 16, 2015 in U.S. Appl. No. 14/614,897, filed Feb. 5, 2015.
Office Action dated Sep. 7, 2016 for U.S. Appl. No. 15/099,297, filed Apr. 14, 2016.
U.S. Appl. No. 14/614,897, filed Feb. 5, 2015.
Final Office Action, dated Mar. 14, 2017, U.S. Appl. No. 15/099,297, filed Apr. 14, 2016.
Non-Final Office Action, dated May 23, 2017, U.S. Appl. No. 15/457,921, filed Mar. 13, 2017.
Apr. 1, 2015, U.S. Appl. No. 14/585,051, filed Dec. 29, 2014.
Apr. 20, 2015, U.S. Appl. No. 14/614,897, filed Feb. 5, 2015.
Oct. 16, 2015, U.S. Appl. No. 14/614,897, filed Feb. 5, 2015.
Sep. 25, 2015, U.S. Appl. No. 14/585,051, filed Dec. 29, 2014.
Mar. 15, 2016, U.S. Appl. No. 14/931,510, filed Nov. 3, 2015.
Jan. 3, 2017, U.S. Appl. No. 15/142,997, filed Apr. 29, 2016.
Jul. 29, 2016, U.S. Appl. No. 15/141,779, filed Apr. 28, 2016.
Jul. 29, 2016, U.S. Appl. No. 15/142,997, filed Apr. 29, 2016.
Sep. 7, 2016, U.S. Appl. No. 15/099,297, filed Apr. 14, 2016.

\* cited by examiner

CYBER RISK ANALYSIS AND REMEDIATION USING NETWORK MONITORED SENSORS AND METHODS OF USE

CROSS-REFERENCE TO RELATED APPLICATION

This application claims the benefit of U.S. Provisional Application No. 62/141,114, filed Mar. 31, 2015, which is hereby incorporated by reference herein in its entirety including all references and appendices cited therein.

FIELD OF TECHNOLOGY

This application is directed to cyber security analysis, and more specifically, but not by limitation to systems and methods that predict and detect cyber security breaches (including entity sophistication and hacker motivation) and provide actionable feedback for remediation of the same.

SUMMARY

According to some embodiments, the present disclosure is directed to a system comprising: (a) a network comprising computing systems that are subject to a cyber risk policy, the cyber risk policy comprising breach parameters defining one or more events that are indicative of a cyber security breach, the breach parameters being associated with a remediation provision in a policy for the computing systems and the network; (b) one or more data collecting devices deployed within the network that collect entity information and monitor network traffic of the network that is related to security information; and (c) a cyber security risk assessment and management system that: (i) automatically detects occurrence of one or more of the events that are indicative of a cyber security breach based on the network traffic; (ii) automatically determines the breach parameters that apply for the one or more events that occurred; and (iii) generates a remediation of cyber security parameters for the network based on the applicable breach parameters determined and the associated remediation provision.

According to some embodiments, the present disclosure is directed to a method comprising: (a) establishing breach parameters for an entity, the breach parameters defining one or more events that are indicative of a cyber security breach, the breach parameters being associated with a remediation provision in a cyber security policy of the entity; (b) automatically detecting occurrence of one or more of the events that are indicative of a cyber security breach; (c) automatically determining the breach parameters that apply for the one or more events that occurred; and (d) causing a remediation based on the applicable breach parameters determined and the associated remediation provision.

According to some embodiments, the present disclosure is directed to a system comprising: (a) one or more data collecting devices deployed within a network that collect entity information and monitor network traffic of the network that is related to security information; and (b) a cyber security risk assessment and management system that: (i) automatically detects occurrence of one or more of the events that are indicative of a cyber security breach based on the network traffic; (ii) automatically determines the breach parameters that apply for the one or more events that occurred; and (iii) generates a remediation of cyber security parameters for the network based on the applicable breach parameters determined and the associated remediation provision.

The network comprises computing systems that are subject to a cyber risk policy, the cyber risk policy comprising breach parameters defining one or more events that are indicative of a cyber security breach, the breach parameters being associated with a remediation provision in a policy for the computing systems and the network.

According to some embodiments, the present disclosure is directed to a method comprising: (a) step for establishing breach parameters for an entity, the breach parameters defining one or more events that are indicative of a cyber security breach, the breach parameters being associated with a remediation provision in a cyber security policy of the entity; (b) step for automatically detecting occurrence of one or more of the events that are indicative of a cyber security breach; (c) step for automatically determining the breach parameters that apply for the one or more events that occurred; and (d) step for causing a remediation based on the applicable breach parameters determined and the associated remediation provision.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present technology is directed to systems and methods for parameter based pricing combined with a service, and may be used in regard to cyber security breaches and prevention thereof. In some embodiments, the methods include establishing a plurality of rules or logic that is referred to as parameters. The present technology can be implemented as a provision in a contract between parties or in a cyber security policy available to a plurality of entities. An example provision will describe breach parameters and payout amounts, in some embodiments.

The breach parameters can define an event or combination of events that indicate that a cyber security breach has occurred. In various embodiments, occurrence of the event(s), indicative of a cyber security breach, is automatically detected. The breach parameters that apply for the one or more events that occurred may be automatically determined by the systems described herein. The method may include generating a set of recommendations to remedy the underlying technology issues that caused or permitted the breach.

The systems can automatically enact remediation measures that improve the cyber security of the network to prevent future cyberattacks (or other cyber events or failures) or reduce the likelihood that such cyber events or failures will result in a cyber security breach.

Various embodiments of systems and methods provide analysis and recommendation tools for determining and reducing cyber risks associated with companies or other entities. An exemplary method comprises determining a sophistication score of the entity with respect to cyber risk, which may be considered the quality of the defense with respect to repelling, defeating, or preventing a cyberattack. The exemplary method also comprises determining a motivation score of a hacker to mount a cyberattack against the entity, which may be considered, in regard to the offense, the quality, time required, ability to pursue, the propensity to be targeted in the first place, and the likelihood for a malicious actor to continue an attack.

A composite score is created from the motivation score and the sophistication score. The exemplary method and system may be used in a cyber security risk market, and/or by a cyber risk analyzer defining cyber risk policies (which can be used for insuring or other purposes). The cyber security risk policy may include a cyber risk assessment/management service, which may provide feedback to one or both of the cyber security risk analyzer and the entity, enabling the entity to determine how to reduce their cyber security risk, and/or why their cyber risk positions them within their peer group. Additionally, following the recommendations may enable the cyber risk analyzer to update and/or change cyber security policy content. In still further alternatives, the composite score of several or many entities may be aggregated and used by other commercial entities, brokers and/or ratings agencies to understand and/or evaluate an aggregate risk and assess policy requirements and/or reinsurance treaties.

Cyber risk analyzers evaluate and protect entities against damage and/or loss due to a cyberattack. Assessing cyber risk can be a difficult task due to the volatility of the cyber environment. For example, a risk of a cyberattack lacks actuarial data since there is an active adversary behind cyberattacks, and past cyberattacks do not predict future cyberattacks. Better analysis of cyber risk, and providing greater service to cyber security risk analyzers and insured entities, is desirable.

Also, cyber breaches can immediately and negatively affect an entity, requiring numerous mitigating processes such as audits, customer reporting, and so forth. These mitigating processes can be deleteriously expensive to an entity. Methods for dealing with the financial impact of these mitigating processes are desirable.

In some embodiments, the present technology implements a parameter based methodology that comprises the establishment of a set of rules or breach parameters that are used to assess when a remediation (network or computer device-based) should occur, in the event of a cyberattack.

The present technology will be described in greater detail with respect to an example use case. In the example use case, a company is associated with a cyber risk policy that includes a parameter based remediation provision. The parameter based remediation provision specifies that, upon the occurrence of one or more breach parameters, a remediation for the company will occur. In one example, the breach parameters include the publication of a breach notification by a newspaper. In another example, the breach parameters could include a notification made to a state Attorney General that a breach has occurred. In some embodiments, the breach parameters could include both notification made to an Attorney General and publication of a breach notification by a newspaper.

In various embodiments, the breach parameters could include notification to the company from a third party cyber security monitoring company that a cyber security breach has occurred. Additionally, breach parameters may include third-party lawsuits involving a cyber security breach.

In general, the breach parameters can comprise any event or group of events that indicate that a cyber security breach has occurred. These events can include both public events, where the cyber security breach is made known to the public (e.g., regulatory agency notification), as well as private events, where the cyber security breach is not made known to the public.

When public events are used as the breach parameters, a computing system or device can be configured to monitor third party websites, RSS feeds, or news sources to determine public pronouncements of cyber security breaches. The computing system can be programmed with logic that allows the computing system to compare detected public notifications of cyber security breaches to rule sets (e.g., breach parameters) and determine if a remediation is required.

In one embodiment the system can enact a remediation based on the applicable breach parameter determined and an associated provision that specifies monetary compensation based on a breach of the cyber risk policy. In some embodiments, the method also includes providing recommendations for improvement to the breached entity based on the nature of the one or more events that occurred.

In some embodiments, the remediation amounts can be selectively adjusted based on a sophistication score of an entity. Thus, if entities have not sufficiently mitigated their risks, the remediation amount to such entities can be reduced.

In various embodiments, a remediation is determined parametrically or algorithmically. In some embodiments remediation may occur with no adjustments or additional factors. Recommendations for improvement can be automatically generated and provided to the breached entity based on the nature of the event(s) that occurred.

In other embodiments, the remediation specified in the cyber risk policy can be selectively altered according to a reducing factor. In one example, an altering factor could be a sophistication score for the entity being below a sophistication threshold established for the computing system or a covered network. The sophistication of an entity is defined, in general, in terms of how prepared or protected the entity is against a cyberattack. If the entity is relatively unsophisticated by comparison of their sophistication score, the cyber risk policy provider can selectively alter a remediation by a determined amount (e.g., 25%, 50%, 75%, and so forth) when the remediation includes a monetary outlay to users affected by the cyber security breach (such as customers of the entity).

The sophistication score of the entity can be monitored and opportunities to improve their sophistication score can be provided to them. To be sure, changes to the sophistication score can result in adjustment of the altering factor. For example, if the sophistication score increases, the altering factor can be lowered from 50% to 25%. If the sophistication score meets or exceeds the sophistication score threshold, the altering factor can be 0%. For example, the entity may not need to enact any technical changes if the sophistication score is sufficient. Also, the systems of the present disclosure would not be required to institute any automatic technical changes to the network.

In some embodiments, the remediation includes a monetary payout that is selectively adjusted based on event thresholds, such as how many victims are involved in a breach. The computing system can apply event thresholds to set various grades of remediation. By way of example, event thresholds could include the following: if 5,000 or fewer customers are involved in a cyber security breach, the payout would be $25,000; between 5,000 and 25,000 victims, the payout would be $100,000.

The event thresholds and payouts can be stratified as desired. In some embodiments, instead of having tiered ranges, payouts may comprise fixed fees, per record fee, or other flat rate by cost.

Rather than being based on victim/customer count, the event thresholds can be based on any quantifiable measure such as breach location, customer value, hacker location, or any other measure that would be apparent to one of ordinary skill in the art with the present disclosure before them.

In some embodiments, the present technology requires verification of breach parameters by a third party. According to various embodiments, forensic auditing can be used to determine and verify the basis for a breach claim. By way of example, if the breach claim is based on a cyber security breach affecting 100,000 customers of an entity, the entity or a third party should provide the cyber risk analyzer with acceptable proof that 100,000 customers were actually involved before a payout occurs. In some embodiments, verification is only required for certain payout types, such as payouts of over $250,000. To be sure, any threshold may be set for validation to be required.

Although certain description and examples herein refer to a cyber event being a cyberattack, other cyber events or failures also fall within the scope and spirit of the present technology. In some embodiments, the technology disclosed herein provides a cyber risk assessment, and provides methods and systems for improving a cyber risk assessment, by, for instance, reducing a risk of a cyberattack, predicting the probability of a cyberattack, and/or determining the extent to which a cyberattack might cause damage. These methods can be used in combination with the parameter based methods described above.

Exemplary methods plot the cyber risk within a peer group, which may be defined by industry, revenue, and/or any other appropriate metric. Exemplary methods assess risk with a two (or more) dimensional analysis, which may be plotted into a 2×2 matrix or graph, or in any appropriate alternative visualization method, particularly for greater than two dimensions. For example, the two dimensions may be characterized as 1) motivation (which may be synonymous or similar to offense, e.g., the motivation of a bad actor to attack an entity) and 2) sophistication (which may be synonymous or similar to defense, e.g., the sophistication of an entity to prevent and/or repel a cyberattack). Alternative axes for the two dimensional analysis are also possible, for example, measurements other than motivation and sophistication. The system may output an estimated (or expected) financial impact, which may encompass both the risk of a cyberattack, and the potential amount of damage caused by a cyberattack.

In addition to analyzing the cyber risk, the present technology may provide enhanced value by pricing a cyber risk, thereby creating a market for it. Additionally, the present technology provides a cyber risk management service along with a cyber risk policy.

The two (or more) dimensional analysis may be a position on a graph, and may include a scatterplot of the peer group members, and/or a simple ranking amongst the peers. Additionally or alternatively, the two (or more) dimensional analysis may be resolved into a single composite score embodying the two (or more) dimensional analysis. The plot may be adjusted to include more or fewer members of the peer group based on further variables of the peer group members, for instance, revenue, and so forth. Each axes of the two dimensional analysis may be a function of many sub-variables, discussed herein as examples of motivation and sophistication. The sub-variables may be weighted equally, or differently, and the weighting may be static, dynamic, or customizable based on different analysis goals.

Examples of motivation elements include: visibility; value; hacker sentiment; employee sentiment; company sentiment; customer sentiment, and so forth. Each of these motivation elements may be further subcategorized as follows. Visibility may include information and/or derived measures related to the traffic, usage, and activity related to an entity, including but not limited to the in-links, page views, duration, traffic, links, page rank, market value, daily (stock) trade volume, exporting/importing, etc. Value includes: revenue, net income, total assets, employees, and so forth. Hacker sentiment includes: emails, credit cards, foreign languages, and so forth, which can be gathered from hacker forums and/or discussion groups, chat rooms, dark web, or dark net forums, such as the Tor Network, IRC (Internet Relay Chat), etc. Employee sentiment includes: career opportunities, work/life balance, compensation, and so forth. Company sentiment includes: senior leadership ratings, overall company ratings, recommendations, and so forth. Customer sentiment includes: product ratings, service ratings, and so forth.

Figure 2:
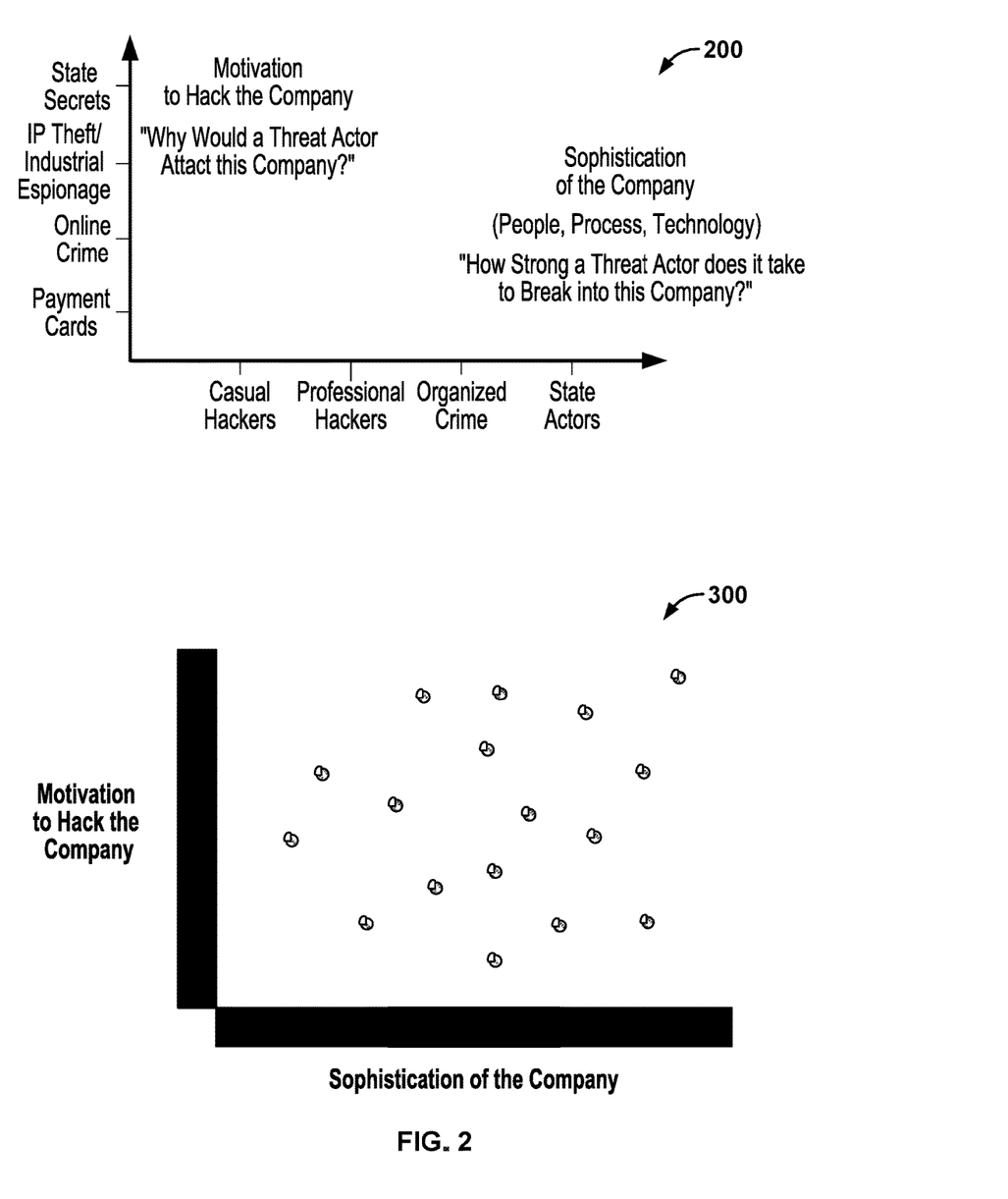
FIG. 2 is a graphical representation of the plotting of motivation scores and sophistication scores.
Figure 3:
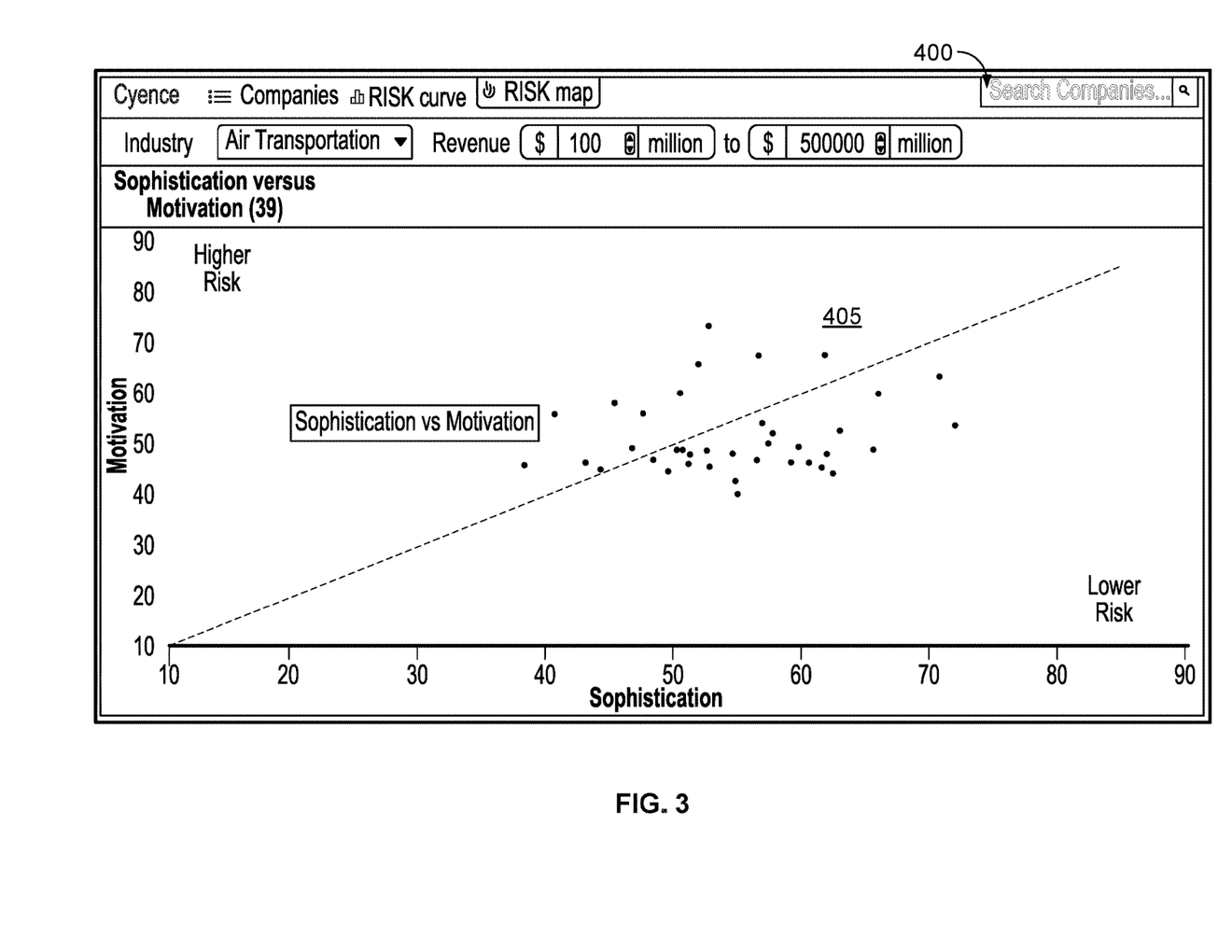
FIG. 3 is another graphical representation of the plotting of motivation scores and sophistication scores for a plurality of entities.

Further examples of motivation elements and sources may be found in FIG. 2, as mentioned above. Exemplary plotting regarding sophistication and motivation are shown in FIG. 3.

Figure 1:
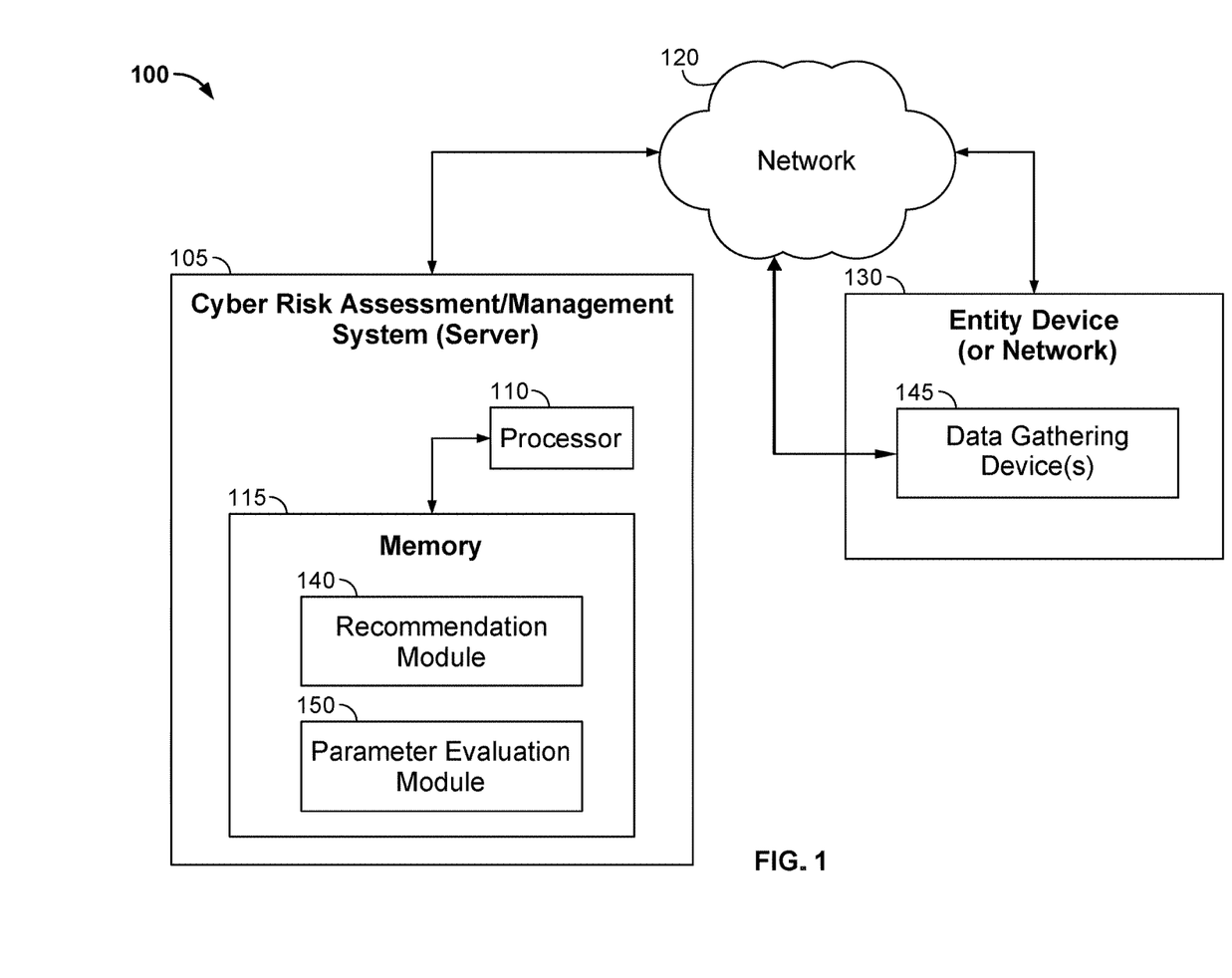
FIG. 1 is a block diagram illustrating a computing architecture according to an example embodiment.

Various embodiments of the present technology can be practiced with a local computer system, and/or a cloud-based system. FIG. 1 is a high level schematic diagram of a computing architecture (hereinafter architecture 100) of the present technology. The architecture 100 comprises a cyber risk assessment/management system 105 (hereinafter also referred to as system 105), which in some embodiments comprises a server or cloud-based computing device configured specifically to perform the analyses described herein. That is, the system 105 is a particular purpose computing device that is specifically designed and programmed (e.g., configured or adapted) to perform any of the methods described herein. The system 105 can be coupled with an entity device or network 130 using a network 120.

In one embodiment, the system 105 comprises a processor 110 and memory 115 for storing instructions. The memory 115 can include a recommendation module 140 and a parameter evaluation module 150. As used herein, the terms "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The system 105 may gather variables for an entity by querying the entity for information, scraping available online sources such as websites, corporate filings, news sources, other public record databases, and resources.

Additionally, data may be gathered from the entity's network 130 using devices already present there or by placing a new device on the entity's network 130 to gather more data, such as data gathering device(s) 145 (also referred to herein as a data collecting device). The data gathering device 145 may be a server, router, firewall, switch, or repeater, or may be a software agent or routine that monitors traffic and/or performs packet inspection. The data gathering device 145 may be on the company's network and/or its periphery, and may collect and/or analyze the data, while also transmitting it to the system 105. In this manner, additional, proprietary data may be gleaned from a particular entity's network. The variables or a subset of the variables can be compared. The comparison can be for all or only a subset of all entities. The subset of variables can be selected by the end user, as well as the entities analyzed.

The system 105 can be configured to determine a level of sophistication of the entity as a baseline in one or more cyber risk analyses. Sophistication may be considered a measure of factors such as people, process, and technology. The factor of people indicates how security-aware the entities' employees, principals and/or members are. In particular, do the people associated with the entity understand the risks, are they competent in security, and so forth. The process factor indicates whether procedures and/or policies have clear and enforceable terms, and clearly indicate what to do in case of various events, including attacks. Process also indicates whether training is provided to employees, third party contractors and/or service providers, and indicates their level of expertise, and so forth.

Examples of sophistication elements include: hosting infrastructure, topology, vulnerability scanning, people, and so forth. Hosting infrastructure includes: content distribution networks, shared hosting, cloud providers, and so forth. Topology includes: accessibility points, page layout, content on site, and so forth. Vulnerability scanning includes: CVEs (common vulnerabilities and exposures), patching, updating, default passwords, and so forth. People includes: chief information security officer (CISO), security team, skills, job postings, and so forth.

In this manner, sophistication encompasses more than just vulnerability, and additionally includes people and processes that may impact a defensive posture of an entity. Further examples of sophistication elements and sources may be found in FIG. 2.

Determining these variables may be a data gathering operation, which may be based on public information or a company's own data networks, as discussed herein. A cyber risk assessment, for instance a 2×2 graph, may be output, along with a composite score, a peer rank, an estimated impact, and recommendations to decrease the cyber risk; these may all be output for each company assessed. All of these elements may be updated over time and in response to implementation of recommendations, thus, transforming the original data via the use of a particular computer.

The exemplary assessment system may provide recommendations to an entity to improve their cyber risk assessment, by, for instance, improving aspects of their network security that raise their cyber risk. This may be accomplished by various methods, including increasing the sophistication of the organization or entity by an improvement in policies or systems, or decreasing the motivation of the attacker to go after this organization or entity. The recommendations may be specific and may impact one or both of the axes of the two dimensional risk analysis. Implementing the recommendations, which may be accomplished in some embodiments automatically, may reduce the risk of the cyberattack.

Implementing the recommendations may impact their relative position in their peer group, as well as any expected financial impact of a cyberattack. Additionally, factors beyond the control of the company or entity, for instance, actions by the other peer group member or activity in the hacker community or vulnerabilities in software and/or hardware, may also impact both a relative risk analysis (e.g., impacting the company or entity's position in their peer group) and/or an absolute expected financial loss. This change over time may be accessible and/or charted for trending information, which may be useful for planning and/or remediation. An entity may make a judgment of which recommendations to prioritize in implementation based on the different recommendations provided by the system to other members of their peer group.

Additionally, implementing the recommendations may be paired with a consequent lower (or higher or otherwise changed) cyberattack likelihood and an improved cyber security risk profile. The terms of the reduction may be implemented after the end of the term (e.g., 1, 3, 6 or 12 months, or any other appropriate term) of the current cyber risk policy, or may trigger a renewal option at the lower rate immediately or on an accelerated basis. In this manner, a cooperative and constructive relationship may be achieved between users and cyber risk policy analyzers, thereby creating a positive feedback loop of improved cyber preparedness and lower/higher/changed premiums.

In response to making a cyber risk assessment, the recommendation module 140 can be executed to provide the end user (or entity) with some type of actionable feedback. For example, the recommendation module 140 can provide the end user with one or more actions based on the diversity score and the clusters of similar variables. These one or more actions potentially decrease the cyber risk of the entity. In one example, the recommendation module 140 can automatically identify variables, which if changed, would affect the cyber risk assessment. In further exemplary embodiments, entities may agree to automatic implementation of recommendations in exchange for lower policy premiums.

Exemplary methods and systems according to the present technology may also provide benchmarking over time. In this manner, a company or other entity may track their cyber risk over an adjustable time period, for example, days, weeks, months, and/or years. This benchmarking may be against a dynamic or static evaluation of the peer group, for instance, an entity's past and present cyber risk tracked against a static past peer group, static present peer group, and/or dynamic peer group. The present technology provides information related to the updated information (the new motivation score, the new sophistication score, the new composite score, etc.), including differences (the amount of the change made in one or more updates, namely the delta), and trends (patterns over many time steps).

In some embodiments, the system 105 comprises a parameter evaluation module 150 that is configured to establish a set of breach parameters as specified above. The parameter evaluation module 150 can also be configured to monitor third party informational sources such as websites, RSS feeds, blogs, and other news sources to determine cyber security breach notifications. In some embodiments, the parameter evaluation module 150 is configured to maintain a database of insured entities that includes at least the name of the entity (and other related entities), as well as employee/management names. The parameter evaluation module 150 can search the cyber security breach notifications for these various types of names.

If a match is found, the parameter evaluation module 150 can compare the breach notification to payout provisions associated with the breach parameters and transmit a message to the insured that a payout is required.

In some embodiments, the parameter evaluation module 150 also applies reducing factors and event thresholds prior to payout. For example, the parameter evaluation module 150 can compare a sophistication score of an entity to a sophistication threshold. If the sophistication score is lower than the threshold, the parameter evaluation module 150 can transmit a message to the insurer that the payout should be reduced by an appropriate reducing factor. The reducing factor selected by the parameter evaluation module 150 can be based on how discrepant the sophistication score is relative to the sophistication threshold. The more divergent the score is from the threshold, the larger the reducing factor, which results in a lower payout.

FIG. 2 illustrates an example graph 200 that plots motivation attributes on a Y-axis of the graph and sophistication of an organization on an X-axis of the graph. As a company (or other entity) is evaluated by the systems of the present disclosure, motivation scores and sophistication scores are calculated and plotted onto the graph 200.

A plurality of entities are plotted on graph 300 using a composite value that is a combined score generated from a motivation score and sophistication score. The plotted points are placed onto the graph and may belong to a peer group or other grouping. The graph 300 provides a visual indicator of the composite score of an entity compared with other entities within the group.

FIG. 3 illustrates a scatter plot graph 400 that includes a plurality of data points that are indicative of composite scores for a plurality of entities in a peer group. A trend line 405 or other relative measurement indicator can be utilized to visually separate entities that pose a higher risk of cyberattack (above the trend line 405) from entities that pose a relatively lower risk of cyberattack (below the trend line 405).

Figure 4:
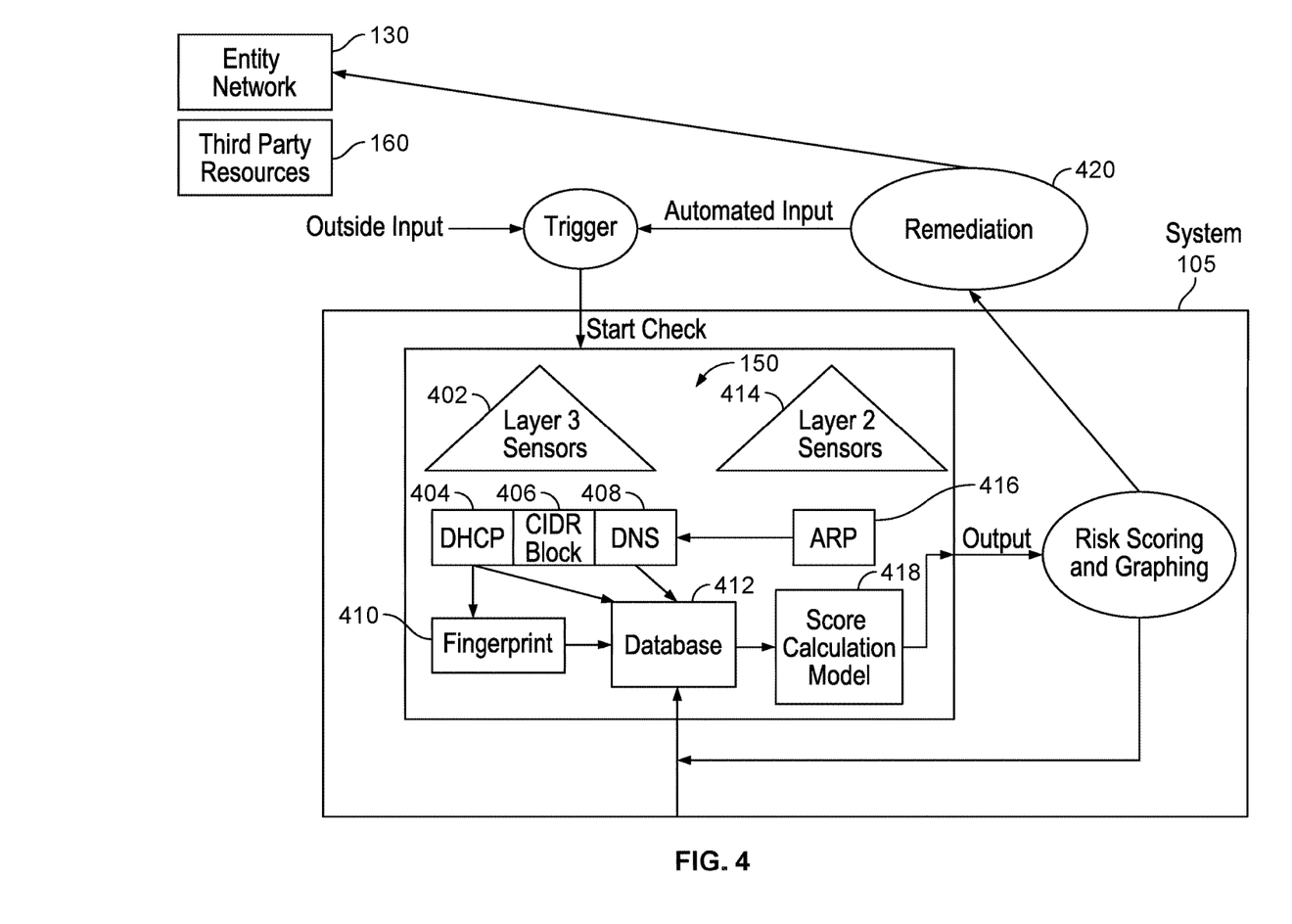
FIG. 4 is a block diagram illustrating a parameter evaluation module according to an example embodiment.

FIG. 4 is a schematic diagram of an example embodiment of a parameter evaluation module 150. The parameter evaluation module 150 can be configured as a stand-alone computing device or service executing within a network. The parameter evaluation module 150 can receive network traffic from computing devices associated with an entity network 130. In some embodiments, the parameter evaluation module 150 receives network traffic from the data gathering device(s) 145 (shown in the example in FIG. 1) deployed on or near the entity network 130.

The operation of the parameter evaluation module 150 may occur, in some embodiments, when a trigger is detected such as when the system 105 detects that a cyber security breach has occurred relative to the entity network 130. In other instances a trigger is not required and the entity network 130 can be analyzed on demand.

As mentioned above, the system 105 can query the entity device or network for information, as well as third party resources 160 to scrape available online sources, retrieve corporate filings, and query news sources and public record databases for information that indicates that a trigger event has occurred.

The parameter evaluation module 150 can evaluate any network traffic obtained by the system 105 relative to the entity network 130. The network traffic that is evaluated can include, but is not limited to, data collected regarding employees using the entity network or individual computing systems within the entity network. In other embodiments the network traffic comprises data collected regarding websites visited by employees. Various examples embodiments include inspection of Kerberos tickets and other authentication or authorization protocols, date and time classifiers, TCP/IP network flow data for incoming and outgoing connections including port information, and analysis of web traffic using deep packet inspection.

The network traffic may be evaluated to determine aspects of hacker motivation and/or entity (network) sophistication as defined above.

In one embodiment, the parameter evaluation module 150 is configured to process network traffic at various TCP/IP layers. In some embodiments, the parameter evaluation module 150 comprises layer (level) three analysis sensors/services 402 that evaluate the network traffic for dynamic host protocol (DHCP) information 404, classless inter-domain routing (CIDR) blocks 406, and domain name system (DNS) information 408, or any combinations thereof. Information collected using these protocols may serve as building blocks for understanding an otherwise unknown network architecture. Further evaluation of the information collected can allow for topology mapping and targeted collection for systems with more identified risk.

In some embodiments, the parameter evaluation module 150 is configured to create a fingerprint 410 of the network traffic from the DHCP information 404, and store the fingerprint 410 in a database, such as database 412.

The parameter evaluation module 150 comprises layer two analysis sensors/services 414 that evaluate the network traffic for determining address resolution (ARP) protocol information 416 from the network traffic.

According to some embodiments, the layer three analysis sensors/services 402 are a first set of sensors and the layer two analysis sensors/services 414 are a second set of sensors. In one embodiment, the layer two analysis sensors/services 414 determine the ARP data 416 and transmit the same to the layer three analysis sensors/services 402. In one embodiment, the DNS service of the layer three analysis sensors/services 402 receives the ARP information 416. The DNS information 408 and ARP information 416 are stored in the database 412.

As mentioned above, the system 105 gathers both entity information and network traffic. The entity information and network traffic can be processed as described herein to calculate both a motivation score and a sophistication score for one or more entities/entity networks using a score calculation module 418. The motivation score and sophistication score are utilized in the calculation of a composite score. Again, the motivation score is indicative of a desire level of a malicious actor to cause a cyber security risk for the entity and a sophistication score that is indicative of a cyber security sophistication of the entity. A motivation score may involve, for example, factors such as frequency of mention on social media sites, frequency of website visits, or press releases related to certain triggered events. A sophistication score may involve, for example, factors including distribution of data and servers, remote access behavior, as well as network segmentation and internal security controls.

In some embodiments, a remediation process 420 is executed by the system 105 as described in greater detail below with reference to FIG. 5.

Figure 5:
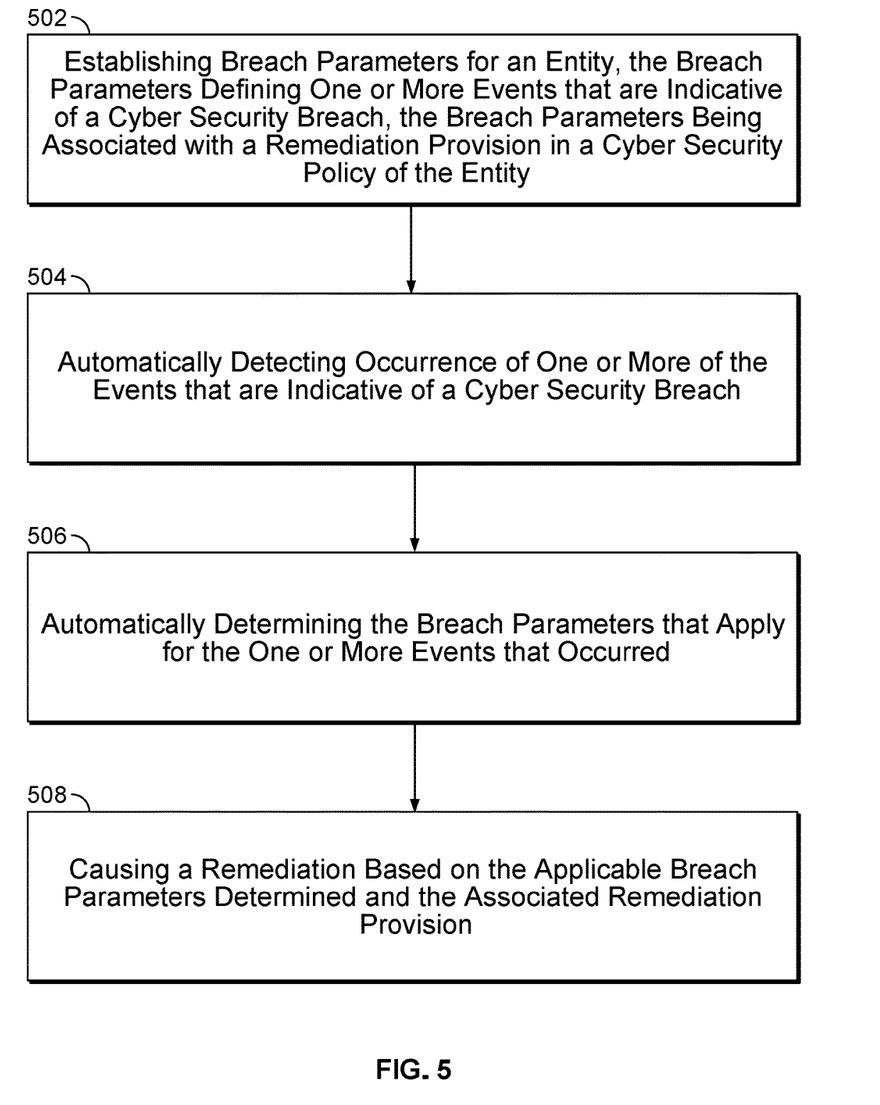
FIG. 5 is a flowchart of an example method for detecting and remediating a cyber security breach in accordance with the present disclosure.

FIG. 5 is a flowchart of an example method of the present disclosure. The method includes a step 502 of establishing breach parameters for an entity. As mentioned above, the breach parameters are included in a cyber security policy for the entity. In some embodiments the breach parameters define one or more events that are indicative of a cyber security breach. For example, the breach parameters are associated with a remediation provision in the cyber security policy of the entity. For example, if the remediation can include a requirement for the entity to enact network changes that selectively reduce the motivation score for the entity or selectively increase the sophistication score of the entity. By way of example, the breach parameters can include specifications regarding the release of personally identifiable information by the entity based on a breach in network password requirements (e.g., a hacker breached the network because the password requirements for the entity were lax). The remediation could include an automatic increase in password complexity by the system 105 in response to the breach.

In some embodiments, the method includes a step 504 of automatically detecting occurrence of one or more of the events that are indicative of a cyber security breach. Again, this could include receiving notice directly from the entity or the system 105 detecting an event from publically available information sources.

In some embodiments, the method includes a step 506 of automatically determining the breach parameters that apply for the one or more events that occurred. In the example above, the breach parameters would involve password security.

The method can also comprise a step 508 of causing a remediation based on the applicable breach parameters determined and the associated remediation provision. For example, the system 105 can automatically increase the password requirements for the network. The system 105 can suspend current passwords and users can be prompted to create a new password that meets increased levels of complexity compared to the prior password. For example, the system 105 can require the user to include non-standard characters, numbers, upper and lower case letters, overall length, or combinations thereof. Thus, the recommendations for improvement provided to the breached entity are based on the nature of the one or more events that occurred.

The example above would increase the sophistication of the entity and thus the sophistication score of the entity. In sum, the sophistication score and changes in sophistication scores are linked or tied directly back to the remediation adjustments enacted or suggested by the system 105.

In some embodiments, the system 105 can generate a set of recommendations that will, if enacted, improve either (or both) the motivation score and the sophistication score of the entity. These recommendations can include suggestions that cannot be directly implemented by the system 105. For example, the system 105 can determine that the sophistication score for an entity is being hampered by the fact that the entity is using a content delivery network (CDN) that is known for breaches in cyber security. The system 105 can determine this from evaluation of online resources or public announcements that detail breaches at the CDN used by the entity. The system 105 can identify the CDN as a problematic area that is affecting the entity's sophistication score. Thus, the "network" can include not only the computing components in the network that are controlled by the entity, but also computing resources not directly controlled by the entity such as technology vendors, SaaS services, and other technology utilized by the entity.

Other example changes in the network can include, but are not limited to, hosting infrastructure changes, network or website topology changes, vulnerability scanning changes, content distribution networks changes, shared hosting changes, cloud services changes, patching changes, updating changes, default passwords changes, and any combinations thereof. Some of these changes can be enacted by the system 105 directly upon calculation of motivation and sophistication scores for the entity.

Figure 6:
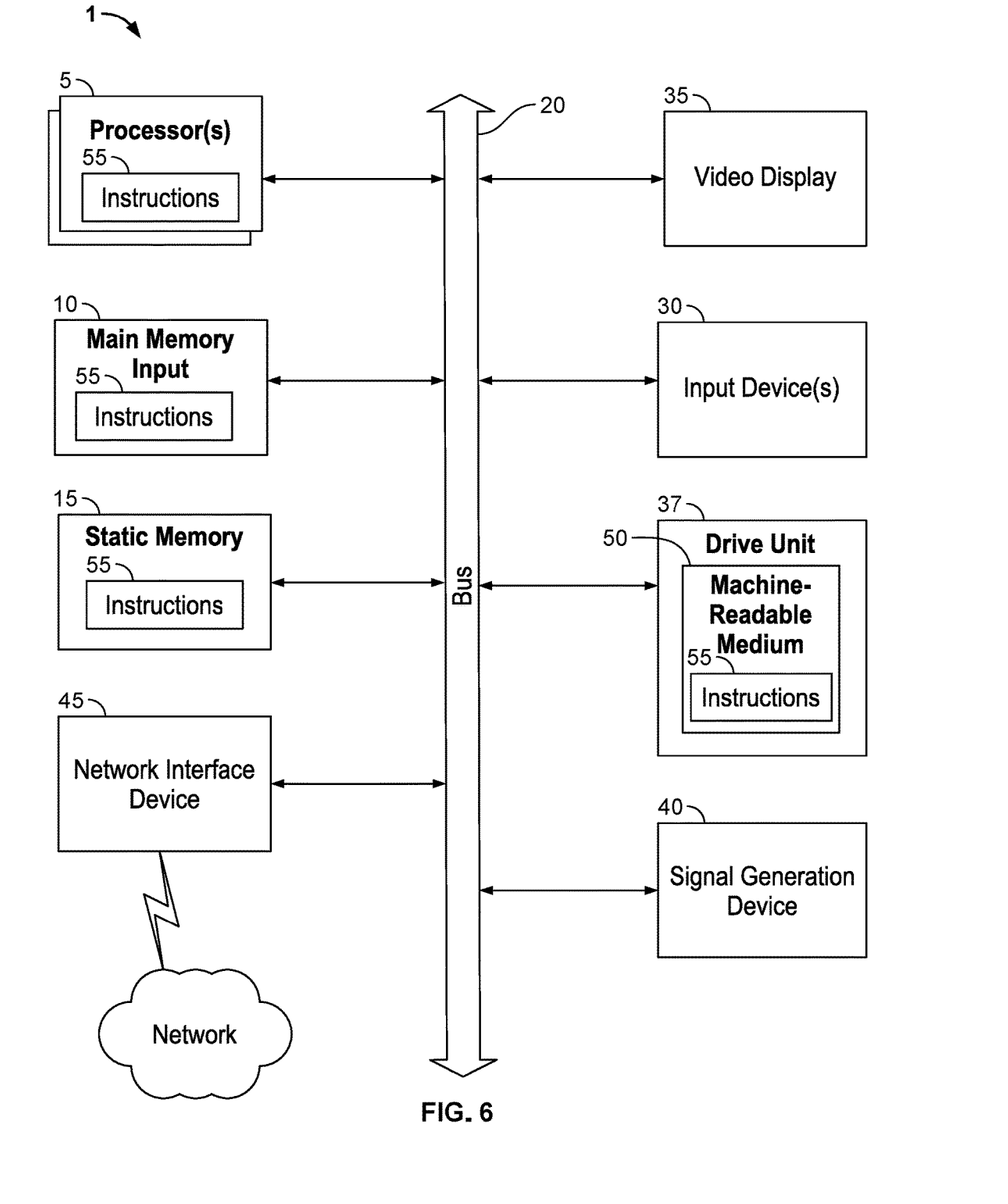
FIG. 6 illustrates an example computer system that can be used to implement embodiments of the disclosed technology.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an input device(s) 30 (e.g., an alpha-numeric input device (e.g., keyboard), and/or a cursor control device (e.g., a mouse)), a voice recognition or biometric verification unit (not shown), a drive unit 37 (also referred to as disk drive unit), a signal generation device 40 (e.g., a loudspeaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10, static memory 15, and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

Reference throughout this specification to "one embodiment" or "an embodiment" means that a particular feature, structure, or characteristic described in connection with the embodiment is included in at least one embodiment of the present technology. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a," an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected," "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A system, comprising:
   one or more computing systems that are subject to a cyber risk policy, the cyber risk policy comprising breach parameters defining one or more events that are indicative of a cyber security breach, the breach parameters being associated with a remediation provision in a policy for the computing systems and a network;
   one or more data collecting devices deployed within the network that collect entity information and monitor network traffic of the network that is related to security information;
   a processor configured to:
      utilize the entity information and the network traffic to calculate a composite score from a motivation score and a sophistication score, wherein the motivation score is indicative of a desire level of a malicious actor to cause a cyber security risk for the entity and the sophistication score is indicative of a cyber security sophistication of the entity;
      automatically detect occurrence of one or more of the events that are indicative of a cyber security breach based on the network traffic;
      automatically determine the breach parameters that apply for the one or more events that occurred;
      generate a remediation of cyber security parameters for the network based on the applicable breach parameters determined and the associated remediation provision, wherein the remediation of cyber security parameters at least includes modifying a password requirement associated with the one or more computer systems; and
      perform the remediation based on the breach parameters, wherein the remediation causes network changes that selectively reduce the motivation score for the entity or selectively increase the sophistication score of the entity, wherein at least one of the network changes includes increasing a password complexity associated with the system and prompting a user associated with the entity to create an associated password that complies with the password complexity; and
   a memory coupled to the processor and configured to provide the processor with instructions.

2. The system according to claim 1, wherein the network traffic comprises data collected regarding employees using the one or more computing systems or the network.

3. The system according to claim 1, wherein the network traffic comprises data collected regarding websites visited by employees using the network and the one or more computing systems.

4. The system according to claim 1, wherein the processor is configured to evaluate the network traffic on one or more network layers.

5. The system according to claim 4, wherein the network traffic is evaluated for any of dynamic host protocol (DHCP) information, classless inter-domain routing (CIDR) blocks, and domain name system (DNS) information included in the network traffic.

6. The system according to claim 5, wherein the processor is further configured to:
   create a fingerprint of the network traffic from the DHCP information; and
   store the fingerprint in a database.

7. The system according to claim 1, wherein the processor comprises a first set of sensors that operate on a data link layer of the network.

8. The system according to claim 7, wherein the processor further comprises a second set of sensors that operate on an Internet Protocol Address layer of the network to evaluate address resolution (ARP) protocol information from the network traffic.

9. The system according to claim 8, wherein the second set of sensors transmits the ARP protocol information to the first set of sensors for storage in a database along with DNS information.

10. The system according to claim 1, wherein the remediation comprises recommendations for improvement for the breached entity based on a nature of the one or more events that occurred.

11. The system according to claim 1, wherein the processor is further configured to query the entity or the network for information, scrape available online sources; retrieve corporate filings, and query news sources and public record databases.

12. The system according to claim 1, wherein the processor is further configured to:
evaluate a plurality of networks to generate a plurality of risk scores and a plurality of motivation scores, the plurality of networks comprising the network; and
plot the plurality of risk scores and the plurality of motivation scores graphically as a peer group.

13. The system according to claim 1, wherein the entity information and the network traffic are evaluated for any of visibility, value, hacker sentiment, employee sentiment, company sentiment, customer sentiment, and combinations thereof.

14. The system according to claim 1, wherein the entity information and the network traffic are evaluated for any of traffic, usage, in-links, page views, duration, traffic volume, links, page rank, market value, stock trade volume, exporting/importing information, and combinations thereof.

15. A method, comprising:
establishing breach parameters for one or more computer systems and a network, the breach parameters defining one or more events that are indicative of a cyber security breach, the breach parameters being associated with a remediation provision in a cyber security policy of the one or more computer systems and a network;
collecting entity information and monitoring network traffic of the network that is related to security information;
utilizing the entity information and the network traffic to calculate a composite score from a motivation score and a sophistication score, wherein the motivation score is indicative of a desire level of a malicious actor to cause a cyber security risk for the entity and the sophistication score is indicative of a cyber security sophistication of the entity;
automatically detecting occurrence of one or more of the events that are indicative of a cyber security breach based on the network traffic;
automatically determining the breach parameters that apply for the one or more events that occurred;
generating a remediation of cyber security parameters for a network based on the applicable breach parameters determined and the associated remediation provision, wherein the remediation at least includes modifying a password requirement associated with the one or more computer systems; and
performing the remediation based on the breach parameters, wherein the remediation causes network changes that selectively reduce the motivation score for the entity or selectively increase the sophistication score of the entity, wherein at least one of the network changes includes increasing a password complexity associated with the system and prompting a user associated with the entity to create an associated password that complies with the password complexity.

16. The method according to claim 15, further comprising providing recommendations for improvement for the breached entity based on the nature of the one or more events that occurred.

17. The method according to claim 16, further comprising tying at least one of sophistication scores and changes in sophistication scores to remediation adjustments.

18. The method according to claim 15, wherein the remediation comprises a change to a hosting infrastructure, network or website topology, vulnerability scanning, content distribution networks, shared hosting, cloud services, patching, updating, default passwords, and any combinations thereof.

19. A computer program product, the computer program product being embodied in a non-transitory computer readable storage medium and comprising instructions for:
establishing breach parameters for one or more computer systems and a network, the breach parameters defining one or more events that are indicative of a cyber security breach, the breach parameters being associated with a remediation provision in a cyber security policy of the one or more computer systems and a network;
collecting entity information and monitoring network traffic of the network that is related to security information;
utilizing the entity information and the network traffic to calculate a composite score from a motivation score and a sophistication score, wherein the motivation score is indicative of a desire level of a malicious actor to cause a cyber security risk for the entity and the sophistication score is indicative of a cyber security sophistication of the entity;
automatically detecting occurrence of one or more events that are indicative of a cyber security breach based on the network traffic;
automatically determining one or more breach parameters that apply for the one or more events that occurred, wherein the one or more breach parameters define the one or more events that are indicative of the cyber security breach, wherein the one or more breach parameters are associated with a remediation provision in a policy for one or more computing systems;
generating a remediation of cyber security parameters for the network based on the applicable breach parameters determined and the associated remediation provision, wherein the remediation of the cyber security parameters at least includes modifying a password requirement associated with the one or more computing systems; and
performing the remediation based on the breach parameters, wherein the remediation causes network changes that selectively reduce the motivation score for the entity or selectively increase the sophistication score of the entity, wherein at least one of the network changes includes increasing a password complexity associated with the system and prompting a user associated with the entity to create an associated password that complies with the password complexity.

20. The system of claim 1, wherein the motivation score is based in part on at least one of a frequency of mention on a social media site, a frequency of website visits, or a press release related to one or more particular triggered events.

\* \* \* \* \*

UNITED STATES PATENT AND TRADEMARK OFFICE
CERTIFICATE OF CORRECTION

PATENT NO. : 10,404,748 B2
APPLICATION NO. : 15/082890
DATED : September 3, 2019
INVENTOR(S) : Arvind Parthasarathi, George Y. Ng and Matthew Honea It is certified that error appears in the above-identified patent and that said Letters Patent is hereby corrected as shown below:

On the Title Page

Item (56), references cited, foreign patent documents, cite no: 2, delete "WO2014038396" and insert --WO2014036396--, therefor.

In the Claims

Claim 1, Column 16, Line 31, delete "determined and the associated" and insert --determined and an associated--, therefor.

Claim 15, Column 17, Line 54, delete "risk for the entity" and insert --risk for an entity--, therefor.

Claim 16, Column 18, Line 12, delete "based on the nature" and insert --based on an nature--, therefor.

Claim 19, Column 18, Line 54, delete "determined and the associated" and insert --determined and an associated--, therefor.

Signed and Sealed this
Third Day of March, 2020

Andrei Iancu
*Director of the United States Patent and Trademark Office*